No. 628,870. Patented July 11, 1899.
C. H. TOMPKINS.
BREECH LOADING ORDNANCE.
(Application filed Feb. 20, 1897.)

(No Model.) 5 Sheets—Sheet 1.

Witnesses.
C. F. Kilgore
P. D. Merchant

Inventor
Charles H. Tompkins
By his Attorney
Jas. F. Williamson

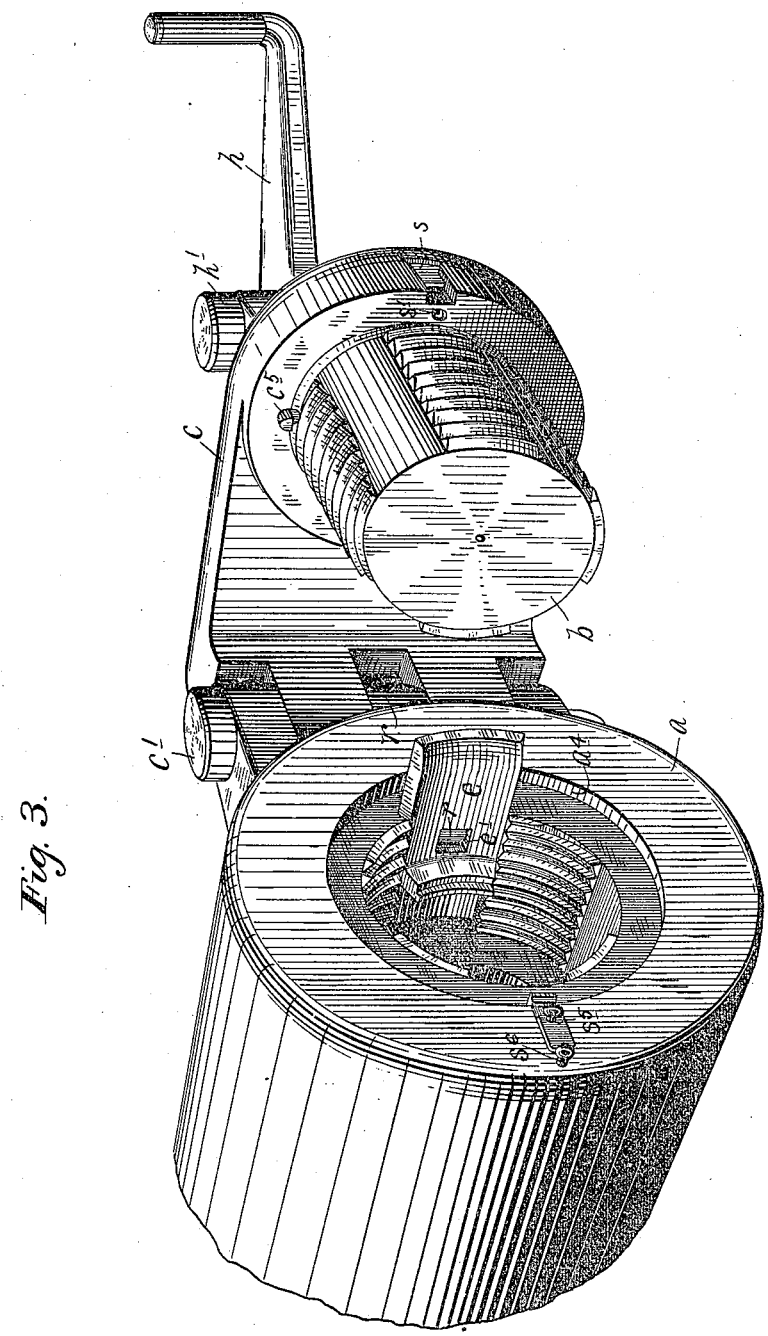

No. 628,870. Patented July 11, 1899.
C. H. TOMPKINS.
BREECH LOADING ORDNANCE.
(Application filed Feb. 20, 1897.)
(No Model.) 5 Sheets—Sheet 3.
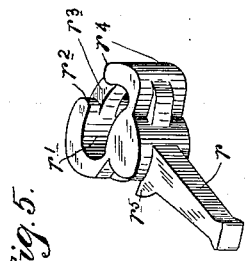
Fig. 5.
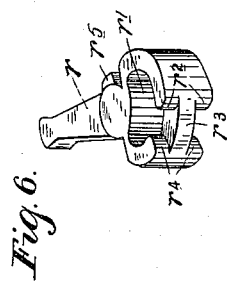
Fig. 6.
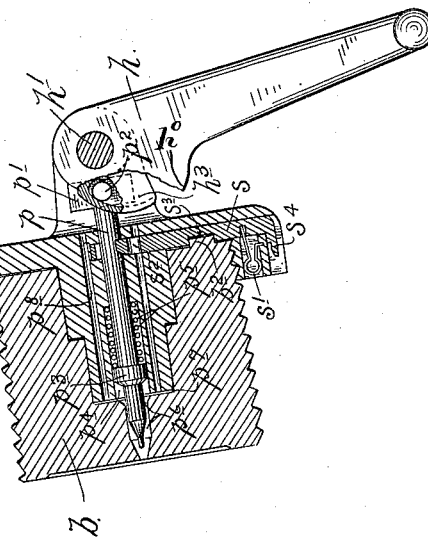
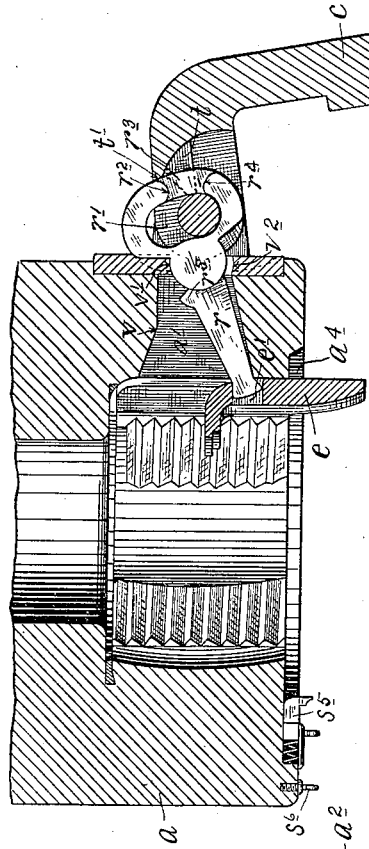
Fig. 4.
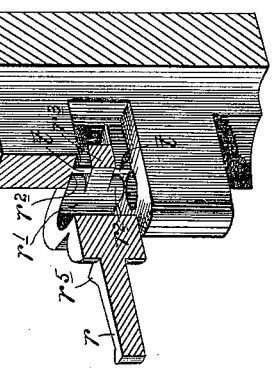
Fig. 7.
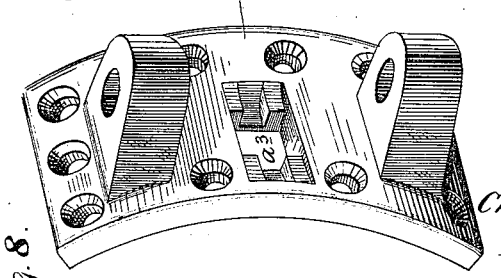
Fig. 8.
Witnesses.
C. F. Kilgore
P. D. Merchant.
Inventor.
Charles H. Tompkins
By his Attorney
Jas. F. Williamson No. 628,870. Patented July 11, 1899.
C. H. TOMPKINS.
BREECH LOADING ORDNANCE.
(Application filed Feb. 20, 1897.)

(No Model.) 5 Sheets—Sheet 4.

Witnesses.
C. F. Kilgore
F. D. Merchant

Inventor.
Charles H. Tompkins
By his Attorney
Jas. F. Williamson

No. 628,870. Patented July 11, 1899.
C. H. TOMPKINS.
BREECH LOADING ORDNANCE.
(Application filed Feb. 20, 1897.)
(No Model.) 5 Sheets—Sheet 5.
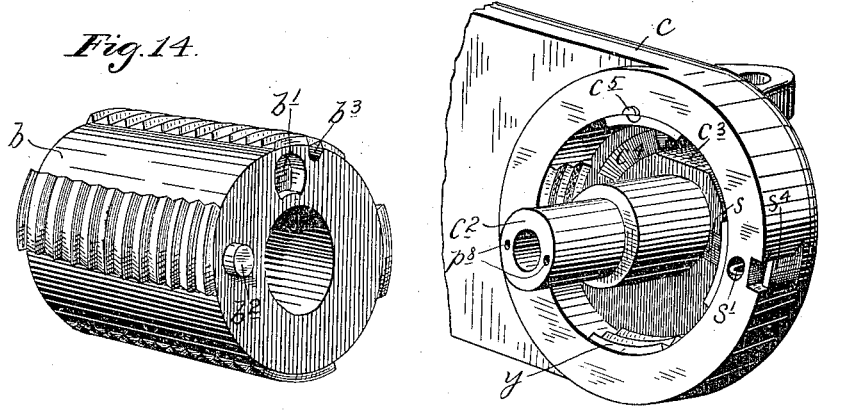
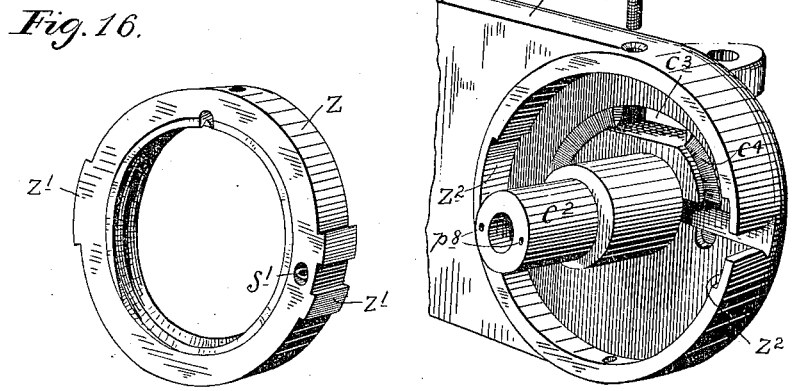
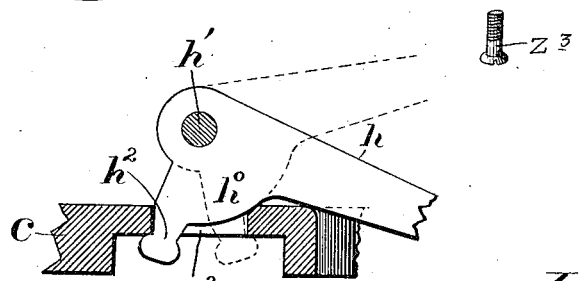
Witnesses
C. F. Kilgore
P. D. Merchant
Inventor
Charles H. Tompkins
By his Attorney
Jas. F. Williamson

UNITED STATES PATENT OFFICE.

CHARLES H. TOMPKINS, OF SOMERVILLE, NEW JERSEY.

BREECH-LOADING ORDNANCE.

SPECIFICATION forming part of Letters Patent No. 628,870, dated July 11, 1899.

Application filed February 20, 1897. Serial No. 624,439. (No model.)

*To all whom it may concern:*

Be it known that I, CHARLES H. TOMPKINS, a citizen of the United States, residing at Somerville, in the county of Somerset and State of New Jersey, have invented certain new and useful Improvements in Breech-Loading Ordnance; and I do hereby declare the following to be a full, clear, and exact description of the invention, such as will enable others skilled in the art to which it appertains to make and use the same.

My invention relates to breech-loading ordnance, and has for its object to improve the same with a view of increased efficiency.

To these ends my invention consists of the novel devices and novel combinations of devices which will be hereinafter described and defined in the claims.

The invention is illustrated in the accompanying drawings, wherein like notations refer to like parts throughout the several views.

Figure 1:
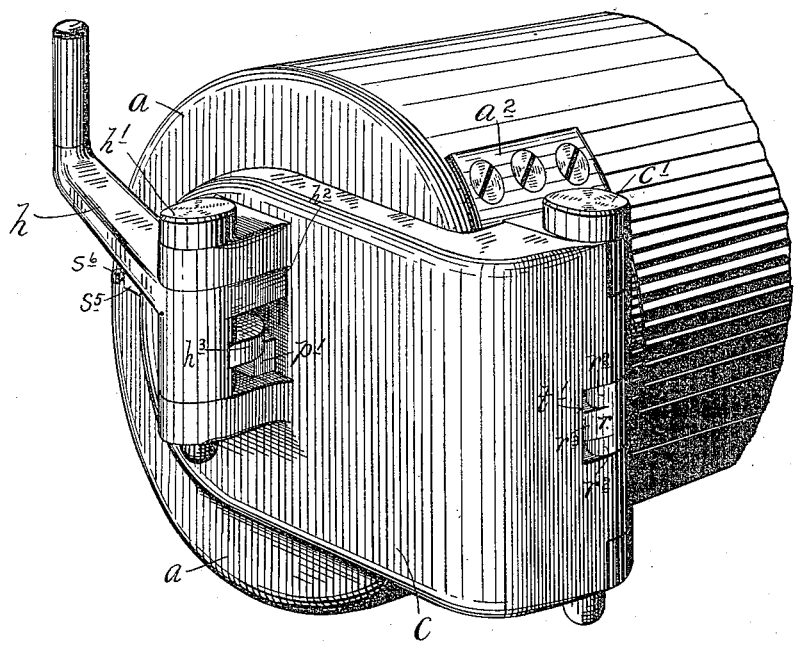
Figure 2:
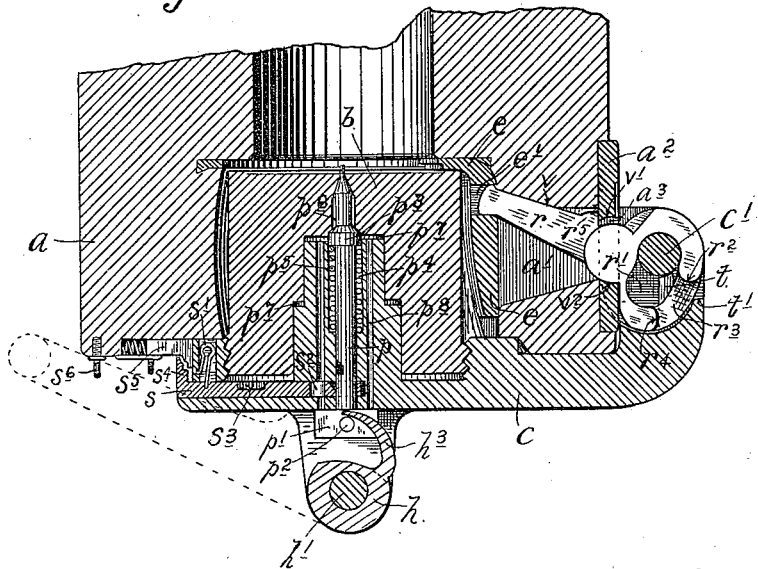
Figure 9:
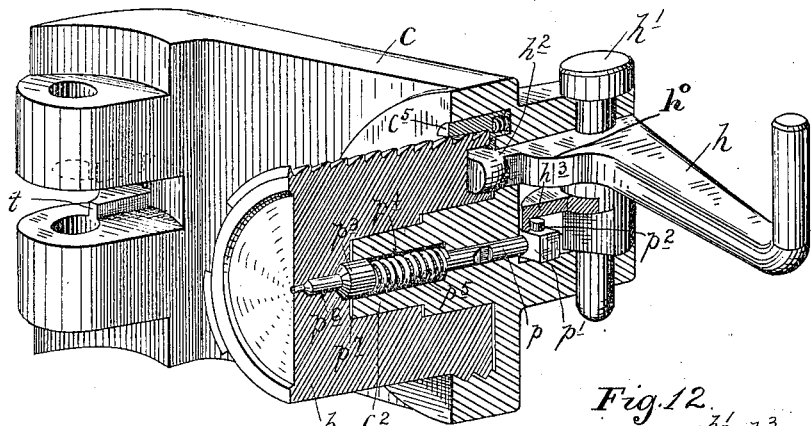
Figure 10:
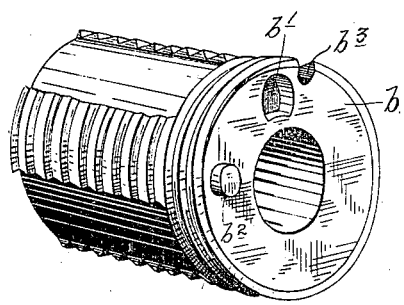
Figure 12:
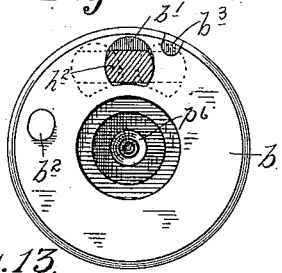
Figure 13:
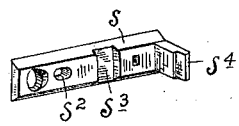
Figure 11:
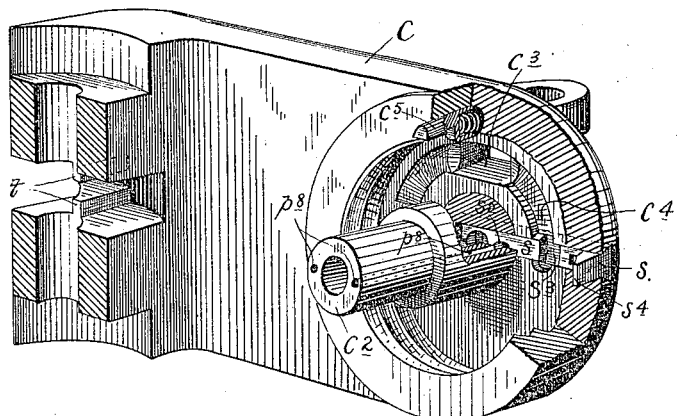

Figure 1 is a perspective view looking at the rear end of a gun equipped with my improved breech mechanism, with the breech mechanism closed and locked to the gun. Fig. 2 is a horizontal central section through the breech and breech mechanism, with the parts shown as they would appear after firing and before the block is unlocked from the gun. Fig. 3 is a perspective view of the parts shown in Fig. 1, with the breech mechanism in its open position. Fig. 4 is chiefly a horizontal central section through the breech and breech mechanism, but with some portions broken away and others shown in plan, with the breech mechanism at the extreme limit of its opening movement. Fig. 5 is a perspective view showing the extractor-lever detached. Fig. 6 is a similar view looking at the extractor-lever in the opposite direction. Fig. 7 is a detail in sectional perspective for showing the relation of the lugs on the extractor-lever to the lugs on the carrier. Fig. 8 is a perspective view showing the hinge lug-plate of the gun detached. Fig. 9 is a sectional perspective showing the carrier and breech-block and their operative parts detached from the gun. Fig. 10 is a perspective view of the breech-block detached from the carrier. Fig. 11 is a sectional perspective of the carrier with the breech-block, rotator, and firing-pin removed. Fig. 12 is an end elevation of the breech-block, with the finger of the rotating lever sectioned in working position and the line of the lever's travel shown in dotted lines. Fig. 13 is a perspective view of the sear detached. Figs. 14 and 15 are perspective views of a breech-block and carrier, respectively, showing a modified construction for connecting the block and carrier. Figs. 16 and 17 are perspective views illustrating a further modification for connecting the breech-block and carrier, involving the carrier-ring shown in Fig. 16, which is removably secured to the carrier shown in Fig. 17. Fig. 18 is a detail, partly in section, showing the means for closing the rotator-finger slot in the breech-block carrier for the purpose of keeping out dust The breech of the gun $a$ and the exterior of the cylindrical breech-block $b$ are provided with screw and blank segments or slottings, which are in complemental relation to each other in the breech and on the block for cooperation to lock and unlock the block in respect to the gun by rotary movement of the block. As shown, the screw segments and slottings are quadruple or four in number for permitting the block to be locked to the gun or unlocked therefrom by one-eighth turn of the block. The screw-threads at the rear end of the block in the construction shown in the main views, Figs. 1 to 12, inclusive, are uninterrupted and engage with corresponding threads formed in a countersunk seat for the block on the inner face of the carrier $c$. Otherwise stated, the block $b$ screws into the carrier $c$ and always engages therewith substantially in the same way as in the Seabury patent, No. 514,967, of February 20, 1894. The carrier-plate $c$ is of angular form in plan view or horizontal section, so as to offset the hinge-lugs of the same and permit the carrier to be pivotally connected to the gun by the hinge-pin $c'$ at a point on the side of the gun preferably about midway of the breech, as best shown in Figs. 1 to 4, inclusive. The proper surfaces of the screw-segments in the breech and on the block are cut away on the proper arcs with respect to the hinge-pin $c'$ or carrier-axis for permitting the block to swing directly out of the breech and into the same when unlocked. The block $b$ is recessed to fit over a bearing-pintle $c^2$, projecting from the inner face of the carrier in line with the axis of the gun when the carrier is in its closed position. A bell-crank hand-lever $h$ has its elbow pivoted to suitable lugs projecting from the rear face of the carrier-plate by pin $h'$, and the short arm or finger $h^2$ of this bell-crank lever $h$, working through a slot $c^3$ in the carrier-plate, engages a socket $b'$, eccentrically located on the rear end of the breech-block $b$ for rotating said block into its locked or unlocked position in respect to the gun. The engaging surfaces of said lever-finger $h^3$ and of said block-socket $b'$ are curvilinear in the plane of rotation for coaction as the members of a ball-and-socket joint, and the diameter of said socket $b'$, radial to the block, is greater than the corresponding diameter of the finger $h^3$ for permitting the latter to travel in a horizontal straight line, while the former moves in the arc of a circle, as best shown in Fig. 12. Otherwise stated, the said lever $h$ is mounted to move substantially tangential to the block at the point of its connection therewith, and the ball-and-socket connection between the lever-finger and the block permits the required relative motions of said block and lever with respect to each other. Other connections might be substituted, but probably none would be the full equivalent of the ball-and-socket joint shown in point of simplicity, strength, and economy of friction. In virtue of the fact that said lever $h$ is thus mounted to move substantially tangential to the block, as above described, the component of rotation on the block is almost exactly in the direct line of the lever's travel. Hence a direct and powerful leverage is applied to rotate the block practically without any waste whatever. It is like the action of a sweep-lever applied to a capstan. The body of the finger or lever-arm $h^2$ is sector-shaped, as shown at $h^0$, so as to close the slot $c^3$ in the carrier-plate for the exclusion of dust or dirt when the breech mechanism is in its closed position, as shown in Figs. 1 and 2. The said hand-lever is also provided with a segmental cam $h^3$ for coöperation with the cocking-stud of the firing-pin, as will presently appear. The said breech-block $b$ is also provided on its rear end with an eccentrically-located strong stop-stud $b^2$, which works in a segmental stop-groove $c^4$ in the face of the carrier-plate for limiting the unlocking rotary movement of the block under the action of said hand-lever $h$ and serving also to lock the sear, as will later appear.

The carrier $c$ is provided with a stepped or shouldered spring bolt or latch $c^5$, the body of which is adapted to engage with a marginal notch $b^3$ on the rear end of the block for locking the block to the carrier against further rotary movement in either direction at the limit of the block's unlocking rotary motion in respect to the gun. This spring bolt or catch $c^5$ acts thus to lock the block from rotation during all the time that the block is out of the gun; but as soon as the block reënters the gun and before the relocking movement begins the forward end of said bolt $c^5$ will strike the gun and thus be forced backward against its spring, so as to disengage the body of the bolt from the lock-notch $b^3$ of the block, thereby permitting the latter to rotate on its bearing-pintle $c^2$, as required for locking the block to the gun.

The firing-pin $p$ is centrally disposed in a suitable axial passage, formed partly in the block $b$ and partly in the bearing-pintle $c^2$ of the carrier. The stem of said firing-pin $p$ passes out through the carrier-plate, and has a head $p'$ fixed thereto by the cocking-stud $p^2$. The said stud $p^2$ is subject to the down-turned lip of the segmental cam $h^3$ on the hand-lever $h$ for cocking and guarding the firing-pin, as will later more fully appear. The firing-pin $p$ has a collar $p^3$, which works in a counterbore $p^4$ of the pintle $c^2$, and is subject to the firing-spring $p^5$, which reacts between the said collar and the back or base of said counterbore. The said collar $p^3$ has a beveled or conical face for seating against the bell-mouthed rear end of the pin-passage $p^6$ in the block after firing. The end of the bearing-pintle $c^2$ never abuts tightly against the breech-block, but always leaves an open joint $p^7$ between said parts, which communicates with vent-ducts $p^8$, extending longitudinally through said pintle and carrier radially outward of the spring box or counterbore $p^4$, but within the radius of the pin-head $p'$. The pin-collar $p^3$ is of a length to cover said joint-opening $p^7$ when said collar is seated, as a valve, against the mouth of the pin-passage $p^6$ in the block. Hence in case of a "blow back" upon firing the pressure on said pin-collar will force the same outward into the spring-box or counterbore $p^4$, thereby uncovering the joint-opening $p^7$ and permitting the gas to escape through said vent-ducts $p^8$ without entering the said spring-box or pin-passage in the pintle. Undue outward movement of the firing-pin $p$ in case of blow back is prevented by the abutment of the pin-head $p'$ against the hub of the hand-lever $h$. After firing the pin head $p'$ covers the outer ends of said vents $p^8$, thereby excluding dust. When the firing-pin is cocked, said joint-opening $p^7$ is also uncovered, thereby permitting the escape of air through said vents $p^8$ when closing the breech.

The stem of the firing-pin passes through the eye of the sear $s$, which is mounted on the carrier in a radial seat intersecting the segmental stop-groove $c^4$ of the carrier and one of the vents $p^8$ in the bearing-pintle. The sear is subject to a stiff spring $s'$, pressing the same against the pin, and when the sear engages with the cocking-notch of the pin a perforation $s^2$ in the sear registers with said vent-passage $p^8$ in the pintle and a notch $s^3$ on the forward face of the sear registers with said stop-groove $c^4$ of the carrier for receiving the stop-pin $b^2$ on the breech-block. Under the opening movement of the hand-lever $h$ on its hinge-pin $h'$ the firing-pin $p$ is cocked by the cam $h^3$ just before the completion of the unlocking rotary movement of the block under the action of the lever-finger $h^2$. Hence at the finish of the unlocking rotary motion of the block the stop-stud $b^2$ of the block enters the sear-notch $s^3$ with the effect of locking the sear and the firing-pin in cocked position until the relocking movement of the block has begun. At the same time that the sear is thus locked by the stud $b^2$ the block is locked from further rotation on the carrier by the spring-bolt $c^5$, as hitherto described. Hence the sear-lock continues during all the time that the block is out of the gun, thereby preventing uncocking or premature discharge from any accidental displacement of the sear from jars or other causes and also preventing the sear from being pulled out of its cocked position by catching of the lanyard, when attached thereto, or by the attendant. The cam $h^3$ also acts as a guard to the firing-pin during the whole of the opening movement of the hand-lever $h$ both while turning on its hinge-pin $h'$ and while turning with the carrier on the carrier hinge-pin $c'$. This guarding action of the cam $h^3$ on the firing-pin also continues during the return or closing movement of the breech mechanism up to the final part of the locking movement of the block to the breech. At the finish of the locking movement of the block to the breech the lip of the cam $h^3$ must of course be in a position to afford the necessary clearance to the cocking-stud $p^2$ for permitting the firing action. From the foregoing statement it will be seen that during all the time that the block is out of the gun two guards against premature discharge are in action, and this is also true for an instant before the completion of the unlocking movement of the block and for an instant after the relocking motion of the block begins. Then during the remainder of the locking movement of the block a single guard—to wit, the cam $h^3$—continues to act until just before the final step of the block's locking movement.

The action of the sear has been described as if the sear itself was used as the trigger for the attachment of the lanyard; but, as shown, the sear is provided with a toe $s^4$ for coöperation with the spring-seated trigger $s^5$, located on the gun. A guide-hook $s^6$ is also shown on the gun for the lanyard when firing from the rear.

The shell-extractor $e$ is mounted in a suitable seat in the breech of the gun, so as to work or slide in one of the blank segments thereof. The said extractor $e$ is shown as provided with a recess or hole $e'$ for receiving the inner end of the extractor-lever $r$. This extractor-lever $r$ is mounted in a suitable recess $a'$, cut in the wall of the gun-breech directly opposite to the carrier hinge-pin $c'$, which recess $a'$ is of proper form for coöperation with said lever, as will presently appear. The hinge-lug plate $a^2$ of the gun is also provided with a passage $a^6$, as shown in Fig. 8, of suitable shape for permitting the extractor-lever to work therethrough. The said extractor-lever $r$ (best shown in Figs. 2, 4, 5, 6, and 7) is formed with an enlarged head having a slot or elongated eye $r'$, through which the carrier hinge-pin $c'$ passes. The crown or outer end of this lever-head is cut away, as best shown in Figs. 5 and 6, to afford a front pair of shoulders or lugs $r^2$ and a rear pair of lugs or shoulders $r^4$, projecting from the reduced connecting-web $r^3$ of the head. The hinge-lugs of the carrier $c$ are provided with a pair of projecting lugs $t$, facing each other and spaced apart for embracing the web $r^3$ of the extractor-lever $r$, as best shown in Figs. 2, 4, and 7. These lugs $t$ on the carrier interlock with the lugs $r^2$ and $r^4$ of the extractor-lever at certain parts of the carrier's movement, as will presently be noted. The said lugs $t$ on the carrier are so shaped as to form a shoulder $t'$ on the carrier, which operates at the proper time on the lever-head at or near the lugs $r^2$. With this construction and relation of the lugs on the carrier and the lugs on the extractor-lever clearly in mind the action of the extractor-lever may be best understood by reference to Figs. 2 and 4. In the after-firing position of the parts, as shown in Fig. 2, the extractor $e$ and the extractor-lever $r$ are so related that the said lever fulcrums on the gun at the point $v$. Later on the fulcrum of said lever $r$ shifts to the point $v'$, near the exterior of the gun, and finally the fulcrum shifts to the carrier-pin $c$. The lugs $t$ on the carrier are so related to the lugs $r^2$ and $r^4$ on the extractor-lever that a limited amount of idle movement is permitted to the carrier before action begins on the extractor-lever. This permits the moving parts of the breech-closing mechanism to gather considerable momentum before the lugs $t$ of the carrier abut against the lugs $r^2$ on the head of the extractor-lever in the opening movement. As quick as the lugs $t$ of the carrier do interlock with the lugs $r^2$ of the lever-head the extractor-lever, the carrier $c$, and the hand-lever $h$ become practically a single lever of the first class, with the fulcrum on the gun at the point $v$, near to the weight or the extractor $e$. This enormous leverage, together with the gathered momentum of the moving parts, affords a powerful prying action for starting the shell from the gun. In this primary action the lever-head moves forward across the carrier-pin $c'$ until the lever fulcrums at the point $v'$ on the gun. When this occurs, an accelerated motion will be imparted to the extractor $e$ until the head of the lever is moved forward to its limit crosswise of the carrier-pin $c'$. When this occurs, the carrier-pin $c'$ becomes the fulcrum and the shoulder $t'$ on the carrier suddenly strikes the head of the lever at or near the lugs $r^2$, with the effect of imparting a sudden flip or kick to the extractor and bringing the parts into the position shown in Fig. 4. On the reverse or closing movement of the breech mechanism the carrier-lugs $t$ act on the rearward lugs $r^4$ of the extractor-lever after a limited idle motion with the effect of first moving the head rearward across the carrier-pin $c'$ until the lever fulcrums on the gun at the point $v^3$, and thereafter motion continues over the fulcrum $v^2$ until the parts are thrown into the position shown in Fig. 2.

The extractor-lever $r$ is shown as provided with a shoulder $r^5$, which coöperates with the enlarged part of the lever for closing the passage $a^3$ in the gun hinge-lug $a^2$ substantially dust-tight when the parts are in their closed position, as shown in Fig. 2.

When the breech mechanism is in its closed position, the raised part of the carrier-plate directly surrounding the breech-block fits into a slightly-tapered counterbored recess $a^4$ at the mouth of the breech for closing the breech with a dust-proof joint.

In the modification shown in Figs. 14 and 15 the screw and blank segments or slots of the breech-block are extended entirely to the rear end of the block, and the seat for the block in the carrier-plate $c$ is also provided with suitable screw and blank segments, with the screw-segments $y$ located on the vertical and horizontal diameters of the gun when the breech mechanism is closed. As the screw-segments and the slottings or blank-segments of the block are the forty-five-degree diagonals of the gun when the block is locked to the gun, it follows that the block will be free from the carrier when locked to the gun, but the screw-segments of the block will engage with the screw-segments $y$ of the carrier when the block is unlocked from the gun. Hence with this construction (shown in Figs. 14 and 15) the shock from the explosion upon firing will be taken entirely on the block. With this construction the carrier can also be removed from the block by first pulling the carrier and hinge-pin $c'$ in case the block should become irremovably fast to the gun.

The screw-segments $y$ in the carrier and the rear ends of the screw-segments on the block are preferably left straight, so as to prevent the carrier from being pulled off the block before the rotative movement of the block can be started under the initial opening action of the hand-lever $h$.

In the further modification shown in Figs. 16 and 17 the continuous threads at the rear of the block engage with a sleeve or ring $z$, which is removably secured to the carrier. This ring $z$ is shown as provided with guide-lugs $z'$, which enter coöperating guideways $z^2$ on the carrier for centering the ring in proper working position, and when thus located the ring is secured to the carrier by screws $z^3$ or other equivalent devices, so as to be treated in all ordinary actions as an integral part of the carrier; but in the rare case or emergency of the breech-block becoming irremovably fast in the gun the screws $z^3$ or other securing devices may be withdrawn, thereby permitting the ring $z$ and the carrier to be separated by rearward movement of the carrier after pulling its hinge-pin $c'$. When the carrier itself has thus been removed from the ring and fast block, the ring may then be unscrewed from the block.

Although only two modifications have been illustrated and described, it will be understood that other modifications in the details might be made without departing from the spirit of my invention. It will also be understood that the invention herein disclosed is applicable to other than the cylindrical form of breech-block and is independent of any particular number of screw-segments when the cylindrical block is employed. It will also be understood that the position of the carrier hinge-pin $c'$ may be varied at will to a point farther forward, farther rearward, farther outward, or farther inward in respect to the axis of the gun. Otherwise stated, the position of said carrier hinge-pin or axis will be determined for each gun according to its size, type, dimensions, and form of breech-block or other requirements.

*Summary of operation.*—The general action and advantages of this breech mechanism are probably clear from the foregoing detailed description of the parts, but may be briefly summarized as follows: All the work is done under a continuous swinging movement of the hand-lever $h$ from the position shown in Figs. 1 and 2 to the position shown in Figs. 3 and 4 and return. Under the initial opening movement of the hand-lever $h$, or while turning on its own hinge-pin $h'$, the breech-block is unlocked from the gun and locked to the carrier, the firing-pin is cocked, and the guards against premature discharge are set. As the block reaches the limit of its rotary unlocking motion the block-pin $b^3$ reaches the limit of the carrier-slot $c^4$, thereby arresting the rotary motion of the block and the pivotal motion of said lever $h$ on its own hinge-pin, and all the parts must then swing together on the carrier hinge-pin $c'$ as a center. Under this outward-swinging movement of the lever and carrier together the lugs on the carrier interlock with the lugs on the extractor-lever with the peculiar action described, thereby ejecting the shell. After reloading the reverse movement of the hand-lever restores all the parts to the position shown in Fig. 1, with the block locked to the gun, the breech closed dust-tight, and the firing-pin cocked ready for the use of the gun.

*Advantages.*—Some of the advantages of this mechanism may be stated as follows:

(a) It is simple, with few and strong parts. Nothing has been said in the detailed description as to the questions of proportion, dimensions, or material; but these, of course, would be suitable to the type of gun and the particular uses of the particular parts. It may be noted, however, that the carrier-plate is preferably a steel forging or an annealed steel casting and that as between carrier and block the shell-extracting strain falls on the stop-pin $b^2$ of the block.

(b) The rotator or device for locking and unlocking the block from the gun shows a most direct application of power from the hand-lever without tendency to cant the block and with the friction reduced to a minimum. It permits of great force being exerted without danger of injuring the mechanism and can never fail to function through wear and tear of the parts.

(c) The device or mechanism for extracting the cartridge-shell is also adapted for the most effective application of power, operating under a compound leverage, first with a slow motion to start the shell, then with an accelerated motion, and finally with a kick to eject the shell. This extracting mechanism is also advantageously arranged in that it does not come into play until after the block is unlocked from the gun and is partly withdrawn therefrom. It involves no springs or cams, and the extractor does not turn about the head of the cartridge-case.

(d) There is complete protection against premature discharge and against injury to the mechanism by blow backs.

(e) There is very little cutting away of the gun or the block and what there is is almost entirely confined to the blank-segments. This advantage is due partly to the position of the carrier hinge-pin and partly to the fact that the threaded segments on the block and in the breech are on the forty-five-degree diagonals in respect to the bore of the gun instead of being on the vertical and horizontal diameters of the gun. The recess for the extracting-lever cuts away the body of the gun very little, and the rotator or unlocking device cuts it not at all.

(f) The gun is dust-tight when the breech mechanism is closed.

(g) The mechanism is easily dismantled or assembled, and when either of the modifications shown in Figs. 14 to 17, inclusive, are used for connecting the block to the carrier the carrier and other parts can be removed, when the block becomes irremovably fast in the gun.

(h) The principle of construction disclosed in this breech mechanism is applicable to guns of all sizes and for opening to the left as well as to the right. If the breech-block is to be swung to the left, as for the 3.2-inch gun, the mechanism as here shown would practically be simply reversed, as may be seen by turning the sheet containing Figs. 1 and 2 upside down. The mechanism was especially designed for the 4.72-inch gun; but the power of the rotating or unlocking device is such that the mechanism could be applied to guns of much larger size

What I claim, and desire to secure by Letters Patent of the United States, is as follows:

1. The combination with a gun, rotative breech-block and breech-block carrier pivoted to the gun, of a rotator for said block, comprising a lever pivoted to the rear face of said carrier and having a finger extending through a slot in said carrier and connecting with the rear end of said block, at a point eccentric to the axis of the block, with the said lever mounted to move substantially tangent al to said point of connection with the block, substantially as described.

2. The combination with a gun and rotative breech-block, of a rotator for said block, comprising a pivoted lever having a finger which connects by ball-and-socket joint with the rear end of the block, at a point eccentric to the axis of the block, and is mounted to move substantially tangential to said point of connection with the block, substantially as described.

3. The combination with the gun, the rotative breech-block and the pivoted carrier, of the lever pivoted to the rear face of the carrier and provided with the finger which works through a slot in said carrier and engages, as a ball, with a socket in the rear end of the block, at a point eccentric to the axis of the block, with said lever mounted to move substantially tangential to its point of connection with the block, substantially as and for the purposes set forth.

4. The combination with the gun, of the breech-block carrier pivoted to the gun and having the central bearing-pintle, the breech-block rotative on said pintle, the sear-arresting stop-pin projecting from the rear face of said block into a segmental stop-groove on the forward face of the carrier and the bell-crank lever pivoted to the rear face of the carrier with its short arm or finger working through a slot in the carrier and engaging an eccentric socket on the rear face of said block, all substantially as and for the purposes set forth.

5. The combination with a gun, rotative breech-block and breech-block carrier, of a rotator for said block, comprising a lever pivoted to the carrier and having a finger engaging the rear face of said block eccentric to the block's axis, a firing-pin having a cocking-stud, and a cocking-cam, carried by said pivoted lever, operative to engage said cocking-stud, for cocking the firing-pin, during the unlocking movement and for guarding against premature discharge while the block is out of the gun and until relocked thereto, substantially as described.

6. The combination with a gun, of a breech-block carrier having a segmental stop-groove on its forward face, a rotative breech-block having a stop-pin on its rear face working in said stop-groove, a firing-pin, centrally disposed in said block and carrier, and a radially-movable sear having a notch registrable with said stop-groove and engageable by said stop-pin on the block, when the firing-pin is cocked, for locking said sear and firing-pin in cocked position while the block is out of the gun, substantially as described.

7. The combination with a gun, a rotative breech-block, carrier, firing-pin and sear, of a sear-arresting stop, on the block, and a hand-lever having a cocking-cam, with said parts so arranged that said sear-arresting stop and said cocking-cam both act as guards, against premature discharge, during all the time the block is out of the gun and for an instant after its relocking motion begins, and that said cocking-cam continues to act as a guard during all except the final instant of said block's relocking motion to the gun, substantially as and for the purposes set forth.

8. The combination with the gun, of the rotative breech-block having the stop-pin and finger-socket on the rear face, both eccentric to the axis thereof, the carrier having the segmental stop-groove in which said stop-pin works, the lever pivoted to the carrier and having a finger engaging said socket on the block, the firing-pin with cocking-stud, the cam on said lever engaging said cocking-stud for cocking the firing-pin, during the unlocking movement of the block, and guarding same, during most of the relocking movement of said block, and the radially-movable sear having the notch registering with said stop-groove of the carrier and receiving said stop-pin of the block, for locking said sear and firing-pin in cocked position while out of the gun and until the relocking movement of the block has begun, substantially as described.

9. The combination with a gun, of a carrier having a pintle, a breech-block rotative on said pintle, vents extending through said pintle, and a firing-pin seated in said pintle and block, with said firing-pin constructed to control said vents and said vents so disposed as to lead to the atmosphere without passing through the pin seat or passage of said pintle, substantially as and for the purpose set forth.

10. The combination with a gun, of a carrier having a pintle, a breech-block rotating on said pintle, vents extending through said pintle, and a firing-pin seated in said pintle and block, which pin is constructed to control the admission to said vents at both ends, for permitting the escape of the gases from the breech, upon blow-back, and to exclude dirt when the parts are in the after-firing position.

11. The combination with a gun, of a carrier having a pintle, a breech-block rotative on said pintle, a firing-pin seated in a passage formed partly in the pintle and partly in the block and having a portion which acts as a valve controlling the joint opening between the pintle and the block, and vents tapping said joint opening and leading to the atmosphere, substantially as described.

12. The combination with the gun, of the carrier having the central pintle, the breech-block rotative on said pintle, the headed firing-pin centrally disposed in axial passages of said carrier pintle and block, and having a valve-action collar working in a counterbore of said pintle and seating against the enlarged outer end or valve-mouth of the pin-passage in the block, under the action of its spring, upon firing, and vents extending longitudinally through said pintle but within the radius of the pin-head, whereby said collar controls the admission to the inner ends of said vents, for the escape of air or gas from the breech, and said pin-head covers the outer end of said vents, after firing, for excluding dust, substantially as described.

13. The combination with a gun, breech-block and carrier, of a non-rotating ring having a screw-threaded engagement with the block, and seated in the carrier with a sliding fit, and means for removably locking the said ring to said carrier, whereby, in case the breech-block should become irremovably fast in the gun, the carrier and other parts may be removed therefrom, substantially as described.

14. The combination with the breech-block and the carrier, of the connecting-ring having internal threads engaging external threads on the rear end of the block, and provided with radial lock-lugs on its exterior, the ring-seat in the carrier provided with ways for receiving said lugs, and screws or equivalent devices for removably securing the said ring to the carrier, substantially as described.

15. The combination with a gun-breech, breech-block and carrier, all having screw and blank segments, with the screw-segments of the carrier so disposed in respect to those on the block and in the breech, that when the block is locked to the breech it will be free from the carrier and conversely, substantially as described.

16. In a breech-loading gun of the slotted-screw system, the combination with the breech-block carrier hinged to the gun and slotted to permit the passage therethrough of the rotator-finger, of the breech-block revolubly mounted in said carrier and provided with a socket in its rear for the end of the rotator-finger, the bell-crank lever pivoted on the carrier and provided with an operating-arm, and with a rotator-finger passing through said slot in the carrier said rotator-finger having a sector in rear of the carrier for closing the slot in the carrier through which said finger works, substantially as described.

In testimony whereof I affix my signature in presence of two witnesses.

CHARLES H. TOMPKINS.

Witnesses:
GEORGE E. CONEY,
A. HAMILTON WALLIS.